(12) United States Patent
Chun et al.

(10) Patent No.: US 6,547,496 B2
(45) Date of Patent: Apr. 15, 2003

(54) DIE TAPPING UNIT

(75) Inventors: Victor Chun, Broadview Hts., OH (US); Michael Hajjar, Strongsville, OH (US); Frank Madej, Mentor, OH (US)

(73) Assignee: Danly IEM, division of Connell Limited Partnership, Boston, MA (US)

(*) Notice: Subject to any disclaimer, the term of this patent is extended or adjusted under 35 U.S.C. 154(b) by 0 days.

(21) Appl. No.: 09/917,202

(22) Filed: Jul. 27, 2001

(65) Prior Publication Data

US 2003/0021646 A1 Jan. 30, 2003

(51) Int. Cl.⁷ .................................. B23B 47/04
(52) U.S. Cl. .................. 408/124; 408/102; 408/138; 470/96
(58) Field of Search ................... 408/124, 137, 408/138, 98, 141, 102; 470/96

(56) References Cited

U.S. PATENT DOCUMENTS

| | | | | |
|---|---|---|---|---|
| 2,314,138 A | * | 3/1943 | Garbe et al. ............ | 470/96 |
| 3,162,873 A | * | 12/1964 | Ohme ...................... | 408/124 |
| 3,193,859 A | * | 7/1965 | Pfister .................... | 408/124 |
| 3,579,687 A | * | 5/1971 | Hoshi et al. ............ | 470/96 |
| 4,473,330 A | * | 9/1984 | Chalier .................... | 470/96 |
| 4,692,072 A | * | 9/1987 | Pfister et al. ........... | 408/124 |
| 4,706,369 A | * | 11/1987 | Lavorel ................... | 408/98 |
| 5,173,015 A | * | 12/1992 | Maynard ................. | 408/137 |
| 5,348,429 A | * | 9/1994 | Pfister .................... | 408/137 |
| 6,152,659 A | * | 11/2000 | Seki ....................... | 408/137 |

FOREIGN PATENT DOCUMENTS

| | | | | |
|---|---|---|---|---|
| EP | 761358 A1 | * | 3/1997 | ...... B23G/3/00 |
| JP | 406218625 A | * | 8/1994 | ........... 408/124 |

\* cited by examiner

*Primary Examiner*—Steven C. Bishop
(74) *Attorney, Agent, or Firm*—John R. Benefiel

(57) ABSTRACT

An in-die tapping unit for a press in which two ball screw mechanisms are driven by closing motion between two housing pieces caused by press actuation. Both ball screw mechanisms rotate a central drive gear which causes rotation and axial advance of a pitch adapter sleeve axially advanced by a threaded engagement with a fixed pitch adapter hub, the movable pitch adapter carrying a tap holder, which rotates and advances a tap inserted therein. A striker pad and acceleration spring reduces the shock loading of the unit when the press engages the upper housing piece.

8 Claims, 3 Drawing Sheets

DIE TAPPING UNIT

BACKGROUND OF THE INVENTION

This invention concerns tapping tooling adapted to be mounted in a press and driven by the press motion to carry out a tapping of punched bores in a workpiece.

Such devices have been used to eliminate separately conducted tapping steps.

U.S. Pat. No. 5,173,015 discloses a device in which the press motion drives a shallow pitch planetary roller unit to directly drive a tap to be rotated and advanced axially to carry out a tapping operation.

In other designs, a more steeply pitched ball screw is driven by the press, and a complicated multistage gear train used to rotate the tap at the proper rate of rotation.

See U.S. Pat. Nos. 5,348,429 and 4,692,072 for examples of these devices.

In some prior designs, a steep pitch ball screw is used alone, see U.S. Pat. No. 2,314,138. However, in modem high speed stamping operations, the tap must be rotated more quickly than can be achieved directly by a ball screw mechanism, necessitating the use of the expensive planetary roller nut described alone.

In addition, a change in the tap pitch requires a replacement of the ball screw.

Very shallow pitch threads create high loadings, and add on cam units have been employed to reduce shock loadings for shallow pitch roller nut designs.

In addition, shallow pitch threads are prone to self locking jams.

Another disadvantage of prior designs is the difficulty in changing tap sizes, requiring time consuming changes of the tap holder and/or tap.

It is the object of the present invention to provide an in die tapping unit which is simpler and does not require multistage gearing or very shallowly pitched planetary roller nut devices, and avoids high shock loadings or self locking jams.

It is another object of the present invention to provide such an in-die tapping tool which easily allows changes in tap sizes and replacement of the taps themselves.

SUMMARY OF THE INVENTION

These and other objects which will become apparent upon a reading of the following specification and claims are achieved by a tapping unit having a pair of ball screw mechanisms each having a ball screw shaft of intermediate pitch, each rotated by the advance of respective ball nut by the press platen.

A single stage gear drive is arranged between each ball screw shaft and a central gear hub which receives a rotatable pitch adapter sleeve rotated therewith. The rotatable pitch adapter sleeve has an external thread matched to the tap pitch received in a threaded bore in a surrounding fixed pitch adapter hub.

A tap holder is carried within the rotating pitch adapter sleeve and advances axially therewith when the gear hub is rotated. A quick release coupling secures a tap in the tap holder, and the tap holder may be lifted from the pitch adapter to be changed.

The tap holder is held in the pitch adapter with a snap ring and keyed thereto to rotate therewith.

An upper housing piece carrying the ball screw nuts and a lower housing piece carrying the pitch adapter components are held together by a pair of interposed gas springs, which together with surrounding return springs resist movement of the upper housing piece relative the lower housing piece. A striker pad is slidable in a bore formed into the top.of the upper housing piece with an interposed spring resisting movement into the bore. The spring stiffness is set so that the upper housing is accelerated to the ram speed prior to the ram contacting the top surface of the upper housing piece. This reduces the shock loading of the ball screw and other components.

The use of two ball screws and single stage gear train driving pitch adapter components to rotate and axially advance a top holder simplifies the unit and also reduces the shock loading to increase the load capacity of the tool, as well as service life and cycle rate.

The single stage gearing allows for use of more commonly available right hand helix lead screws.

Also, the single stage gearing can be readily changed to match the axial advance and rotation to a particular tap pitch.

The tap holder can also be readily removed from a movable pitch adapter sleeve to accommodate a change in tap size.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
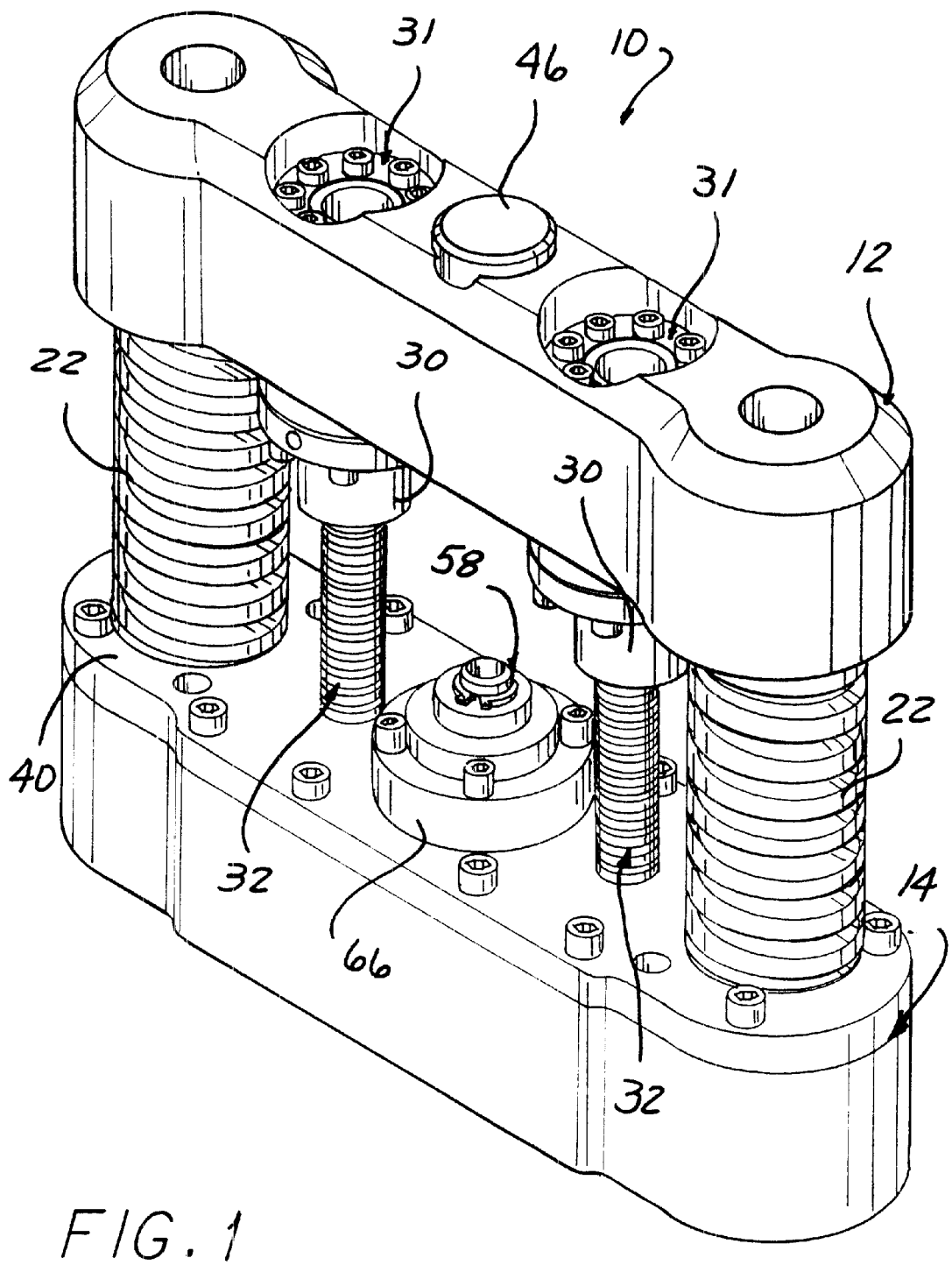
FIG. 1 is a perspective view of an in-die tapping unit according to the present invention.
Figure 2:
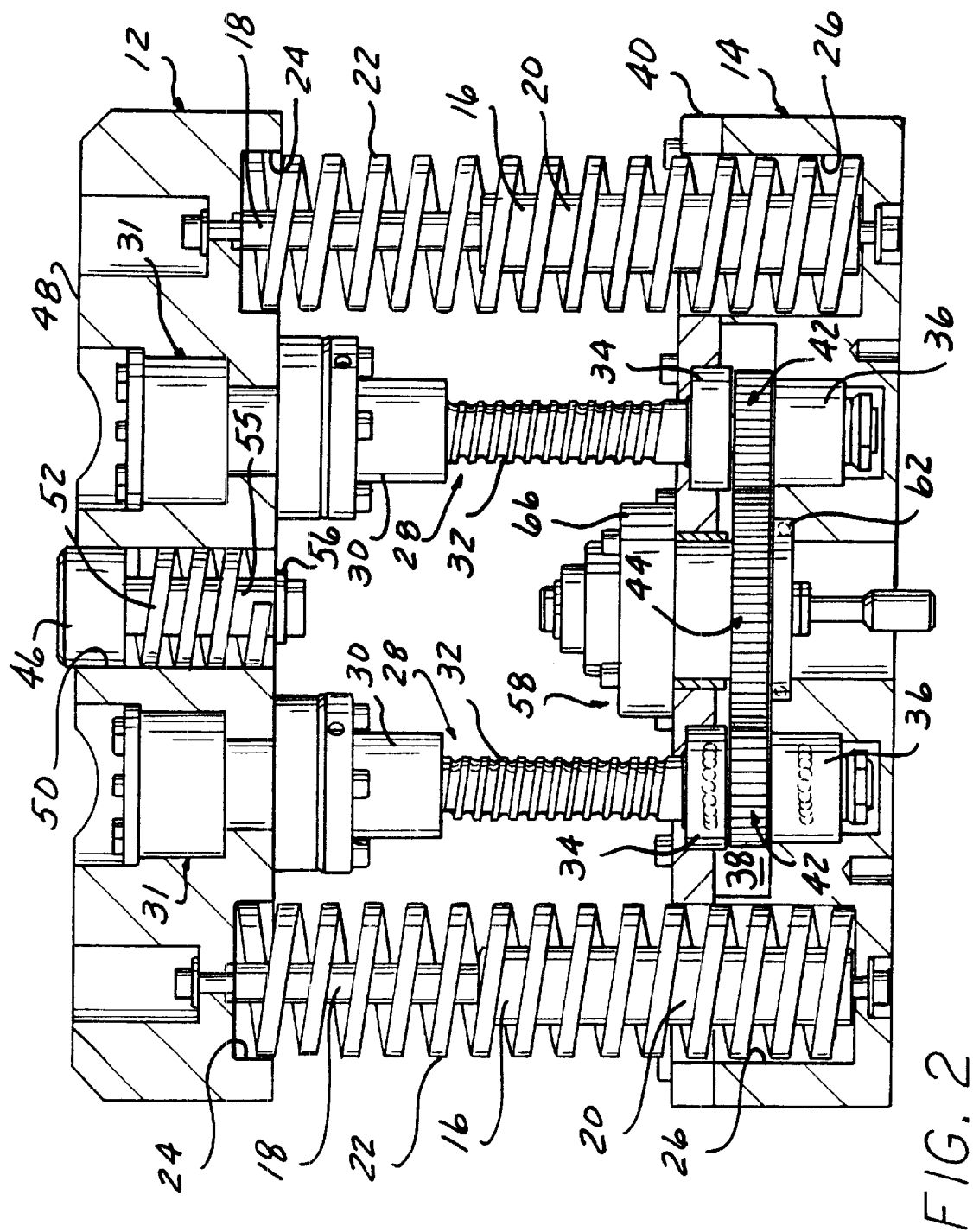
FIG. 2 is a partially sectional view of the tapping unit shown in FIG. 1.
Figure 3:
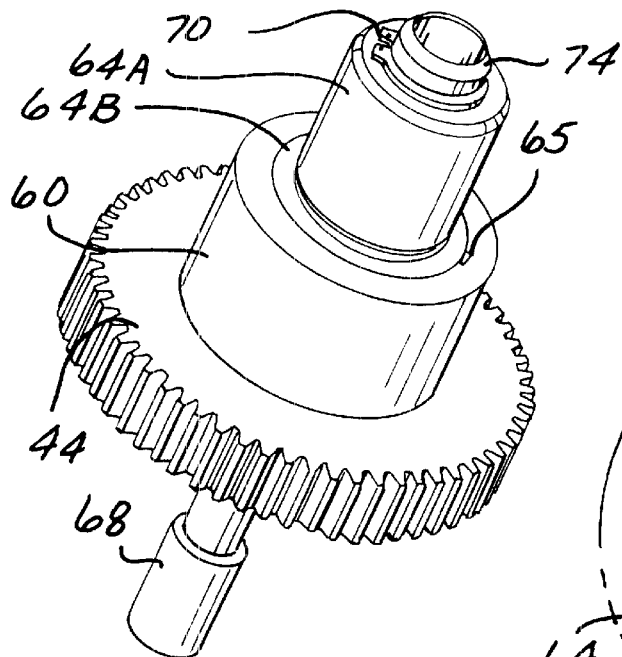
FIG. 3 is a perspective view of a gear hub, pitch adapter and top holder with top subassembly of the tapping unit shown in FIGS. 1 and 2.

Referring to the drawings and particularly FIGS. 1 and 2, an in-die tapping unit 10 according to the invention includes an upper housing piece 12 and a lower housing piece 14 which are held together but spaced vertically apart by a pair of interposed gas spring cylinders 16 connected at either end to respective housing pieces 12, 14. The housing pieces 12, 14 are driven towards or away from each other by the motion of the punch press platens when the unit is installed in the press.

A striker pad 46 is slidable in a bore 50 extending into the top surface 48 of the upper housing piece 12.

An accelerator spring 52 urges the striker pad 46 upwardly to a position protruding above the top surface 48 to be engaged when the press is cycled. A stem portion 54 has a snap ring 56 restraining further upward motion. The accelerator spring 52 has sufficient stiffness so that when the press ram (not shown) engages the striker pad 46, the upper housing piece 12 is accelerated to the ram speed prior to the ram striking the surface 48 to greatly reduce shock loading.

A cylinder rod 18 of each gas spring cylinder 16 is bolted to the upper housing piece 12 while a cylinder 20 is bolted to the lower housing piece 14, as shown in FIG. 2. A pair of return springs 22 are received over a respective gas spring cylinder 16 and received in pockets 24, 26, urging the housing pieces 12, 14 apart.

A pair of ball screw mechanisms 28 are interposed between the housing pieces 12, 14 and operated by the relative movement therebetween.

A ball nut 30 of each mechanism is non-rotatably attached to the upper housing piece 12 by rotationally adjustable fittings 31 and receives the upper end of a ball screw shaft 32. The ball screw shafts 32 are of moderate pitch, steeper than the planetary roller nut units described, but shallower than the direct drive ball screw designs having multistage gearing described above.

The lower end of each ball screw shaft 32 is rotatably supported in the lower housing piece 14, by a ball bearing 34 and a thrust ball bearing 36 mounted in corresponding bores.

A recess 38 in the lower housing piece 14 is overlain by a cover plate 40 secured to the upper side of the lower housing piece by a cap screw as shown.

A pinion gear 42 is keyed to the lower end of each ball screw accommodated by recess 38, and both gears 42 are simultaneously in mesh with a central drive gear 44.

Figure 4:
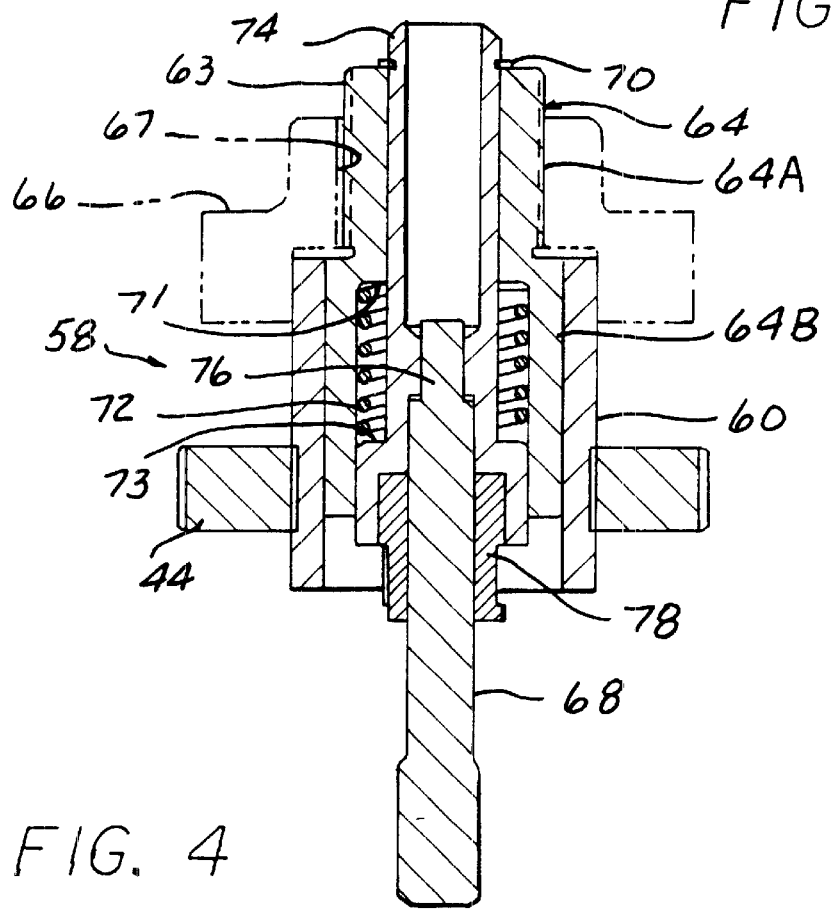
FIG. 4 is a sectional view of the subassembly shown in FIG. 3.

A central drive gear 44 forms a part of a tap holding subassembly 58 supported on a ball bearing 62, including a coupling sleeve 60 (FIG. 4) keyed to the gear 44 to rotate therewith. The coupling sleeve 60 holds a rotatable pitch adapter sleeve 64, with a keyway and key 65 (FIG. 5) preventing relative rotation but allowing axial movement therebetween so that the pitch adapter sleeve 64 may rotate with the drive gear 44. A fixed pitch adapter hub 66 is affixed to the cover plate 40 to be non-rotatable, and has an internal thread 67 mating with an external thread 63 on the upper end 64A of the pitch adapter sleeve, of the same pitch as a tap 68 held in the lower end of the adapter sleeve 64B.

Figure 5:
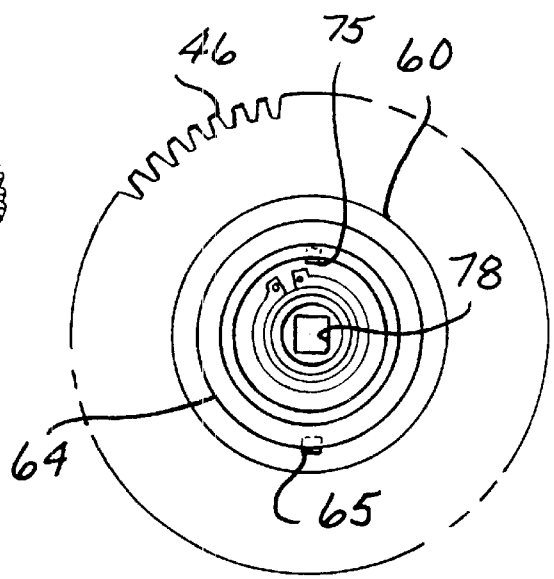
FIG. 5 is an end view of the subassembly shown in FIGS. 3 and 4.

A tap holder 74 is slidable within the pitch adapter sleeve 64, but held to be nonrotatable therein by a key and keyway 75 (FIG. 5).

A snap ring 70 restrains the tap holder 74 from moving down under the influence of a safety spring 72 interposed between opposing axially spaced apart radial faces 71, 73 on the movable pitch adapter 64 and tap holder 74 respectively which allows the tap holder 74 to move up if the tap 68 cannot move down due to the absence of a hole in the workpiece or a positioning error causing misalignment with the hole (not shown).

The tap 68 has a square shank 76 received in a corresponding hole 78 in the tap holder 74. In addition, a quick release collet 78 releasably grips the tap 68.

When the gear 44 is rotated by the rotation of both screw shafts 32 and gears 42 (induced by downward movement of the upper housing piece 12 and ball nuts 30) the pitch adapter sleeve 64 is rotated, and the threaded engagement with the fixed pitch adapter hub 66 causes downward, axial movement of the tap holder 74 as well as rotation. The tap 68 will thus cut a thread in a hole in a workpiece aligned with the tap 68, the rotation and rate of advance set to be matched to the tap pitch.

The tap 68 can be readily changed by removing it from the quick release collet 78. The holder 74 also can be removed by removal of the snap ring 70.

Similarly, the entire subassembly 58 and hub 66 can be removed and replaced with different pitch threads to match different tap pitches.

Thus, the moderately pitched ball screws 32 are not subject to jams, and the single stage gearing and pitch adapter arrangement is lower in cost and allows readily made changes.

The double ball screw driving a single drive gear reduce loading and improves service life.

The striker pad and accelerator spring reduces shock loading and likewise improves service life of the unit.

What is claimed is:

1. An in-die tapping unit for a press comprising:
    an upper housing piece, and an interconnected lower housing piece spaced from said upper housing piece and adapted to be installed in a punch press so as to be drivable towards each other by actuation of said press;
    interposed return springs urging said housing pieces apart;
    two ball screw mechanisms engaged by said housing upper and lower pieces, each having a ball screw and engaged ball nut relatively moved by said upper and lower housing pieces upon actuation of said press to cause relative rotation therebetween, each of said ball screw mechanisms driving a respective output gear;
    a tap driving subassembly carried by said lower housing piece, including a central gear located between said two ball screw mechanism and rotated by said output gears driven by said ball screw mechanisms upon relative movement of said upper and lower housing pieces towards each other, a fixed pitch adapter and an axially movable pitch adapter rotated by said central gear, said fixed and axially movable pitch adapter having mating threads causing axial movement of said movable pitch adapter upon rotation thereof; and,
    a tap holder adapted to receive and rotate a tap, said tap holder held by said axially movable pitch adapter to be rotated and moved axially therewith to carry out tapping of a hole into which said tap is advanced, said mating threads matched to said tap pitch.

2. The tapping unit according to claim 1 wherein said axially movable pitch adapter is received in a coupling sleeve rotatably mounted on said lower housing piece affixed to said gear to rotate therewith, said axially movable pitch adapter engaged by said coupling sleeve to allow said axial movement thereof while rotating therewith.

3. The tapping unit according to claim 1 wherein said fixed pitch adapter comprises a hub fixed to said lower housing piece having a bore formed with internal threads engaged with external threads formed on a portion of said axially movable pitch adapter.

4. The tapping unit according to claim 1 wherein said tap holder comprises an elongated member received within an axial opening in said axially movable pitch adapter, a spring interposed between axially spaced apart radial faces on said movable pitch adapter and top holder respectively to accommodate upward tap movement of a hole is not engaged by said tap.

5. The tapping unit according to claim 1 wherein said subassembly further includes a quick release collet carried by said tap holder gripping a tap inserted therein.

6. The tapping unit according to claim 1 wherein each of said output gears each is attached to a respective ball screw.

7. The tapping unit according to claim 6 wherein both of said ball nuts are affixed to said upper housing piece.

8. An in-die tapping unit for a press comprising:
    an upper housing piece, and an interconnected lower housing piece spaced from said upper housing and adapted to be installed in a punch press so as to be drivable towards each other by actuation of platens of said press;

interposed return springs urging said housing pieces apart;

at least one ball screw mechanism engaged by said housing pieces having a ball screw and engaged ball nut relatively moved by said housing pieces upon actuation of said press to cause relative rotation therebetween;

a tap driving subassembly carried by said lower housing piece, including a gear rotated by said ball screw mechanism upon driving of said housing pieces towards each other, a fixed pitch adapter and an axially movable pitch adapter rotated by said gear, said fixed and axially movable pitch adapter having mating threads causing axial movement of said movable pitch adapter upon rotation thereof;

a tap holder adapted to receive and rotate a tap, said tap holder held by said axially movable pitch adapter to be rotated and moved axially therewith to carry out tapping of a hole into which said tap is advanced, said mating threads matched to said tap pitch;

a striker pad received in a bore extending into a top surface of said upper housing piece and protruding above said top surface, and an accelerator spring urging said striker pad upward, said striker pad restrained to be positioned above said housing piece top surface, said striker pad engaged upon actuation of said press and initiating driving of said upper and lower housing towards each other pieces;

said accelerator spring sufficiently stiff so that only after said upper housing piece reaches press platen speed, said upper housing piece top surface is contacted by a press platen to thereafter begin positively driving said ball screw mechanism.

\* \* \* \* \*